(12) United States Patent
Choi et al.

(10) Patent No.: US 6,549,339 B2
(45) Date of Patent: Apr. 15, 2003

(54) PROJECTION SYSTEM

(75) Inventors: Hark Lim Choi, Kyungki-Do (KR); Dong Ha Kim, Kyungki-Do (KR)

(73) Assignee: Samsung Electro-Mechanics Co., Ltd., Kyungki-Do (KR)

( * ) Notice: Subject to any disclaimer, the term of this patent is extended or adjusted under 35 U.S.C. 154(b) by 15 days.

(21) Appl. No.: 09/798,534

(22) Filed: Mar. 2, 2001

(65) Prior Publication Data

US 2001/0055159 A1 Dec. 27, 2001

(30) Foreign Application Priority Data

Jun. 26, 2000 (KR) .................................. 2000-35224
Dec. 13, 2000 (KR) .................................. 2000-76136

(51) Int. Cl.⁷ .............................................. G02B 27/14
(52) U.S. Cl. ...................................................... 359/634
(58) Field of Search ................ 359/634; 348/335–339; 353/32, 33

(56) References Cited

U.S. PATENT DOCUMENTS

| 6,089,719 A | * | 7/2000 | Lin ............................ 353/33 |
| 6,212,013 B1 | * | 4/2001 | Kodama et al. ............ 359/634 |
| 6,327,093 B1 | * | 12/2001 | Nakanishi et al. .......... 359/634 |

* cited by examiner

Primary Examiner—Georgia Epps
Assistant Examiner—Gary O'Neill
(74) Attorney, Agent, or Firm—Darby & Darby

(57) ABSTRACT

A color corner of a projection system includes a dichroic filter having a flat plate type structure, thereby achieving an improvement in color separation characteristics while allowing easy manufacture of the dichroic filter. The projection system includes an illumination unit for separating an S-polarized light from a non-polarized white light, a polarized beam splitter for transmitting a selected one of the R, G, and B components of the light received from the illumination unit while reflecting the remaining two components of the incident light, and a flat plate type dichroic filter for defining different transmission and reflection optical paths for the separated two light components, respectively, thereby separating the two light components reflected by the polarized beam splitter.

1 Claim, 4 Drawing Sheets

PROJECTION SYSTEM

BACKGROUND OF THE INVENTION

1. Field of the Invention

The present invention relates to a projection system, and more particularly to a projection system wherein a dichroic filter, which is an element constituting a color corner included in the projection system, has a flat plate type structure, other than a cube prism type structure, thereby being capable of achieving an improvement in color separation characteristics while allowing an easy manufacture thereof, so that the projection system achieves an improvement in productivity.

2. Description of the Prior Art

Generally, modern persons have an increased tendency to take private leisure and recreation. For instance, they have an increased tendency to see movies or other images in their private spaces. In pace with such an increased tendency, active research and development have been made to provide image display devices having a screen of an increased size.

By virtue of such research and development coping with the tendency to provide a screen with an increased size, data projectors, projection TVs, and projection monitors have been proposed, which utilize a projection technique incorporated with the concept of projectors. These devices use an optical projection engine. The configuration of such an optical projection engine will now be described in brief with reference to FIGS. 1 and 2.

FIG. 1 is a schematic side view illustrating the optical projection engine. FIG. 2 is a schematic front view of the optical projection engine, illustrating the configuration of a color corner included in the optical projection engine.

FIGS. 1 and 2 illustrate a rear projection monitor which includes the optical projection engine. The basic principle of this rear projection engine is to project a bright and distinct image onto a screen using a micro ($\mu$)-LCD having a high resolution of, for example, an SXGA grade (1,280*1,024), and a high power lamp so that the user can view the image passing through the screen in the rear of the screen.

The constituting elements of the optical projection engine illustrated in FIG. 1 will be described hereinafter.

The lamp mainly includes two portions. One is a bulb for emitting a light beam. The other is a reflector for reflecting the light beam emitted from the bulb. The lamp may be of a parabolic type or an elliptic type in accordance with the configuration of the reflector used.

In the case of a parabolic lamp, light emitted from the bulb is incident onto the reflector which, in turn, reflects the incident light in the form of parallel light beams. On the other hand, in the case of an elliptic lamp, the reflector thereof is designed to focus the light emitted from the bulb. Accordingly, the brightness of the system, to which the parabolic or elliptic lamp is applied, is determined by the amount of light emitted from the lamp used as a light source for the system.

Meanwhile, the light emitted from the lamp may have three wavelength components, that is, components of an ultraviolet (UV) wavelength band, components of a visible wavelength band, and components of an infrared (IR) wavelength band. Among these wavelength components, the wavelength components needed in the system are those of the visible wavelength band. In particular, light components of the UV wavelength band should be removed because they may degrade the performance of optical elements included in the system, plastic lenses, other optical elements, a polarization prism, and LCDs.

Although light components of the IR wavelength band do not result in a direct damage to optical elements, they may cause those optical elements to increase in temperature upon absorbing light of the IR wavelength band. In this case, the optical elements may be degraded in performance.

In order to solve this problem, a heat glass is used. The heat glass is a filter exhibiting a transmittance for the UV and IR wavelength bands relatively lower than that for the visible wavelength band. This heat glass serves to reflect light of wavelength bands, not used, toward the lamp.

The optical projection engine also includes a light pipe. The reason why the light pipe is used is that the light emitted from the lamp has a non-uniform intensity in such a fashion that it exhibits a high intensity at regions near the optical axis thereof while exhibiting intensity gradually reduced at regions spaced away from the optical axis.

When light having such a non-uniform intensity is reflected from an LCD, the image formed on the screen may have a non-uniform brightness. Therefore, the light pipe is used to make the non-uniform light have a uniform intensity as much as possible.

In FIG. 1, the first and second relay lenses are adapted to focus uniform light beams emerging from the light pipe at a desired position. A mirror is arranged between the first and second relay lenses. This mirror serves to change the path of light in order to optimize the space of the system.

The polarization prism is denoted by "Color Corner" in FIG. 2. The light emitted from the lamp is composed of P-wave components and S-wave components. One of these P and S-wave components should be removed because only a single polarized light must be incident onto an LCD which is an image source. To this end, the polarizer is used.

FIG. 3 schematically illustrates the configuration of the color corner shown in FIG. 1 or 2. Typically, the projection system mainly includes an illumination unit, a color separating/synthesizing unit, and a projection unit.

Where the projection system uses reflective LCDs as an imager, the color separating/synthesizing unit has important functions in that it changes the optical path defined between the illumination unit and the projection unit, separates the illumination light into R, G, and B color components, allows those RGB color components to be reflected by the reflective LCDs, or reflects RGB color components respectively received from the reflective LCDs after synthesizing the received RGB color components. To this end, the color corner is used in the projection system.

In FIG. 3, the reference numeral 1 denotes an illumination unit for separating S-polarized light beams from a non-polarized white light, and illuminating the separated light beams to be subsequently reflected, the reference numeral 2 denotes a projection unit for reflecting light contained with an image onto a screen, thereby allowing the image to be formed on the screen, and the reference character CS1 denotes a first color selecting polarization plate for polarizing G (green)-color light beams into P waves while transmitting S-polarized light beams illuminated from the illumination unit 1. The reference numeral 3 denotes a polarized beam splitter for transmitting the P-polarized G-color light components of the light incident thereto after being transmitted through the first color selecting polarization plate CP1 while reflecting the remaining components of the incident light, thereby changing the travel direction of the remaining light components. Also, the reference numeral 4 denotes a dichroic filter for separating B (blue) and R (red)-color components from the light reflected by the polarized beam splitter 3, the reference numeral 5 denotes a reflective LCD for providing an image corresponding to the P-polarized G-color light beams transmitted through the polarized beam splitter 3, the reference numeral 6 denotes a reflective LCD for providing an image corresponding to the B-color light beams reflected by the dichroic filter 4, the reference numeral 7 denotes a reflective LCD for providing an image corresponding to the R-color light beams transmitted through the dichroic filter 4.

Finally, the reference character CS2 denotes a second color selecting polarization plate. When separated R, G, and B-color light beams are reflected by the reflective LCDs 5, 6, and 7 while containing images, respectively, they are changed in polarity. That is, the B and R-color light beams are polarized into P waves, and the G-color light beams are polarized into S waves. To this end, the second color selecting polarization plate polarizes only the G-color components of the composite light incident to the projection unit 2 into P waves while transmitting the remaining components of the incident light as they are, so as to allow all components of the incident light to have the same polarity.

The dichroic filter 4 comprises two 45° prisms, and a color separation layer interposed between the prisms and adapted to separate B and R-color components from each other.

Now, the operation of the conventional projection system having the above mentioned configuration will be described in detail.

When an S-polarized light from the illumination unit 1 is incident to the polarized beam splitter 3, the G-color components of the light are changed into P-polarized light beams at the front surface of the polarized beam splitter 3 because the first color selecting polarization plate CP1 adapted to rotate the polarization direction of G-color light beams by 90° is attached to the front surface of the polarized beam splitter 3. At this time, the polarized beam splitter 3 reflects S-polarized light beams while transmitting P-polarized light beams.

As a result, only B and R-color light beams are incident to the dichroic filter 4, and selectively transmitted through or reflected by the dichroic filter 4. In this case, the dichroic filter 4 reflects the B-color components of the light incident thereto while transmitting the R-color components of the incident light.

However, the dichroic filter 4 arranged, including 45° prisms, at the color corner has a cube prism type structure. By virtue of such a cube prism type structure, the dichroic filter generates a bandwidth difference of about 70 to 80 nm between P and S waves in terms of spectral transmittance characteristics. The spectral transmittance characteristics of the dichroic filter may be sensitive to a variation in angle. For this reason, it is difficult to practically manufacture such a dichroic filter and to manage the specification of the dichroic filter.

SUMMARY OF THE INVENTION

Therefore, the present invention has been made in view of the above mentioned problems involved in the prior art, and an object of the invention is to provide a projection system including a dichroic filter having a flat plate type structure, other than a cube prism type structure, thereby being capable of achieving an improvement in color separation characteristics while allowing an easy manufacture of the dichroic filter, and thus, achieving an improvement in productivity.

In accordance with the present invention, this object is accomplished by providing a projection system comprising: an illumination unit for separating an S-polarized light from a non-polarized white light, and illuminating the separated light to be subsequently reflected; a projection unit for reflecting light, contained with an image and incident thereto, onto a screen, thereby allowing the image to be formed on the screen; a first color selecting polarization plate for polarizing a selected one of R, G, and B components of the S-polarized light, illuminated from the illumination unit, into P waves while transmitting the remaining components of the S-polarized light; a polarized beam splitter for transmitting the P-polarized component of the light incident thereto after being transmitted through the first color selecting polarization plate while reflecting the remaining two components of the incident light, thereby changing the travel direction of the remaining light components; a flat plate type dichroic filter for defining different transmission and reflection optical paths for the separated two light components, respectively, thereby individually separating the two light components reflected by the polarized beam splitter; Three reflective LCDs for providing respective images corresponding to the light component transmitted through the polarized beam splitter and the light components separated by the flat plate type dichroic filter; and a second color selecting polarization plate for transmitting, to the projection unit, the separated R, G, and B-color light components reflected by the reflective LCDs in a state containing images while being changed in polarity, after controlling the R, G, and B-color light components to have the same polarity.

Preferably, the flat plate type dichroic filter has a minimum astigmatism and a thickness of 0.5 mm or less.

BRIEF DESCRIPTION OF THE DRAWINGS

The above objects, and other features and advantages of the present invention will become more apparent after a reading of the following detailed description when taken in conjunction with the drawings, in which.

DESCRIPTION OF THE PREFERRED EMBODIMENTS

The background of the technical idea, to which the present invention is applied, will be first described in brief. Conventionally, dichroic filters used in color corners to separate R and B-color wavelengths have a symmetrical cube type structure in which a color separation layer is interposed between two 45° prisms. Although such conventional dichroic filters are stable in terms of their structure, they exhibit a considerable variation in spectral characteristics depending on a variation in polarization characteristics. As a result, they may undesirably exhibit high-polarized light separation characteristics.

In order to eliminate the above mentioned problem, the inventors made active research. As a result of the active research, it was found that the dichroic filter fabricated on a glass plate exhibits a superior design performance. Accordingly, the present invention is adapted to eliminate problems expected to occur when the plate type structure is applied to the dichroic filter.

Now, a preferred embodiment of the present invention will be described in detail, in conjunction with the attached drawings.

Figure 4:
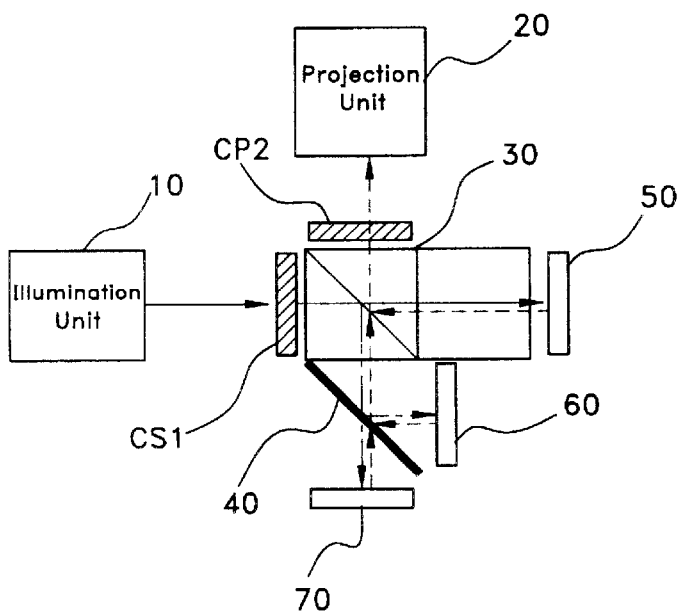
FIG. 4 is a schematic view illustrating the configuration of a color corner included in a projection system according to the present invention.

FIG. 4 schematically illustrates the configuration of a color corner included in a projection system according to the present invention.

In FIG. 4, the reference numeral 10 denotes an illumination unit for separating S-polarized light beams from a non-polarized white light, and illuminating the separated light beams to be subsequently reflected, the reference numeral 20 denotes a projection unit for reflecting light contained with an image onto a screen, thereby allowing the image to be formed on the screen, and the reference character CS1 denotes a first color selecting polarization plate for polarizing G-color light beams into P waves while transmitting S-polarized light beams illuminated from the illumination unit 10. The reference numeral 30 denotes a polarized beam splitter for transmitting the P-polarized G-color light components of the light incident thereto after being transmitted through the first color selecting polarization plate CP1 while reflecting the remaining components of the incident light, thereby changing the travel direction of the remaining light components. Also, the reference numeral 40 denotes a dichroic filter for separating B and R-color components from the light reflected by the polarized beam splitter 30, the reference numeral 50 denotes a reflective LCD for providing an image corresponding to the P-polarized G-color light beams transmitted through the polarized beam splitter 30, the reference numeral 60 denotes a reflective LCD for providing an image corresponding to the B-color light beams reflected by the dichroic filter 40, the reference numeral 70 denotes a reflective LCD for providing an image corresponding to the R-color light beams transmitted through the dichroic filter 40.

Finally, the reference character CS2 denotes a second color selecting polarization plate. When separated R, G, and B-color light beams are reflected by the reflective LCDs 50, 60, and 70 while containing images, respectively, they are changed in polarity. That is, the B and R-color light beams are polarized into P waves, and the G-color light beams are polarized into S waves. To this end, the second color selecting polarization plate polarizes only the G-color components of the composite light incident to the projection unit 20 into P waves while transmitting the remaining components of the incident light as they are, so as to allow all components of the incident light to have the same polarity.

The dichroic filter 40 has a flat plate structure, so that the optical path of light beams transmitted through the dichroic filter 40 and the optical path of light beams reflected by the dichroic filter are different from each other. In this case, transmitting light beams may exhibit an increased astigmatism according to a thickness of the flat plate. In other words, there are increased undesirable effects when the flat plate has an increased thickness. On the other hand, stress may be generated at the flat plate when the flat plate is too thin. The stress may affect the reflection optical path, thereby causing an increase wave surface aberration. As a result, degradation in workability may occur.

It is desirable for the dichroic filter 40 to be arranged on both the transmission and reflection optical paths, so as to minimize the astigmatism generated. When the flat plate of the dichroic filter 40 has a reduced thickness, it is also desirable to minimize the generation of stress, so that there is no influence on the reflecting wave surface. In this case, the flat plate is made using a hard material in order to obtain a minimum thickness.

It is also desirable for the flat plate of the dichroic filter 40 to have a minimum thickness. Preferably, the flat plate has a thickness of about 0.5 mm or less. The optimum thickness of the flat plate is 0.3 mm. The operation of the conventional projection system having the above mentioned configuration will be described in detail.

In the projection system of the present invention, light travels along the same path as that defined by the color corner of the conventional projection system. That is, an S-polarized light from the illumination unit 10 is incident to the polarized beam splitter 30 which, in turn, separates R, G, and B-color components from the incident light, and forces the separated G-color light beams to be directed to an associated one of the reflective LCDs, that is, the reflective LCD 50. The B and R-color light beams are reflected by the polarized beam splitter 30, and then incident to the dichroic filter 40 so that they are selectively transmitted through or reflected by the dichroic filter 40. In this case, the dichroic filter 40 reflects the B-color components of the light incident thereto so that the B-color light beams are directed to the reflective LCD 70. The dichroic filter 40 also transmits the R-color components of the incident light so that the R-color light beams are incident to the reflective LCD 60.

Figure 5:
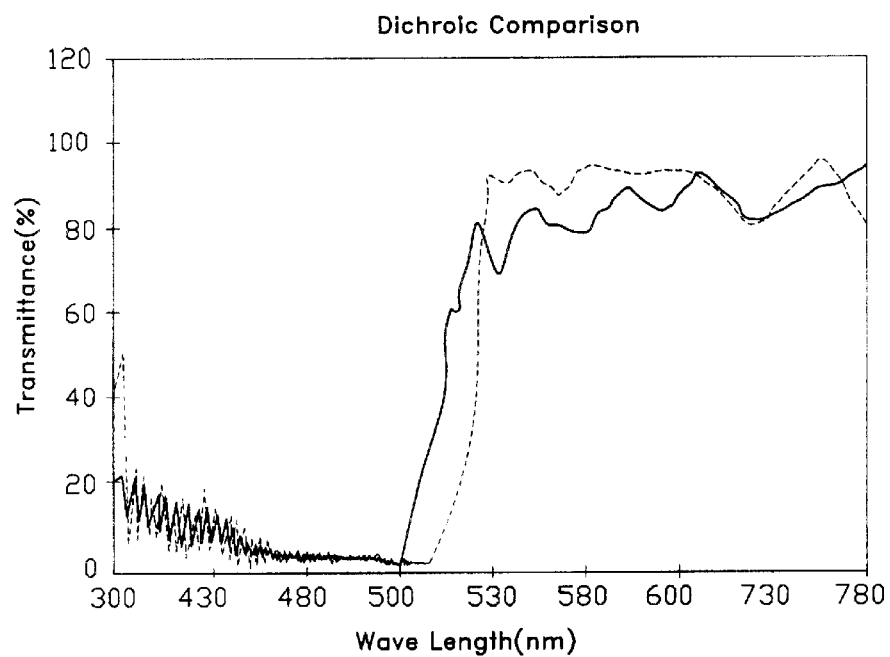
FIGS. 5 and 6 depict graphs respectively illustrating a comparison between the dichroic filter of the present invention and the conventional dichroic filter in terms of transmission and reflection characteristics, respectively.
Figure 6:
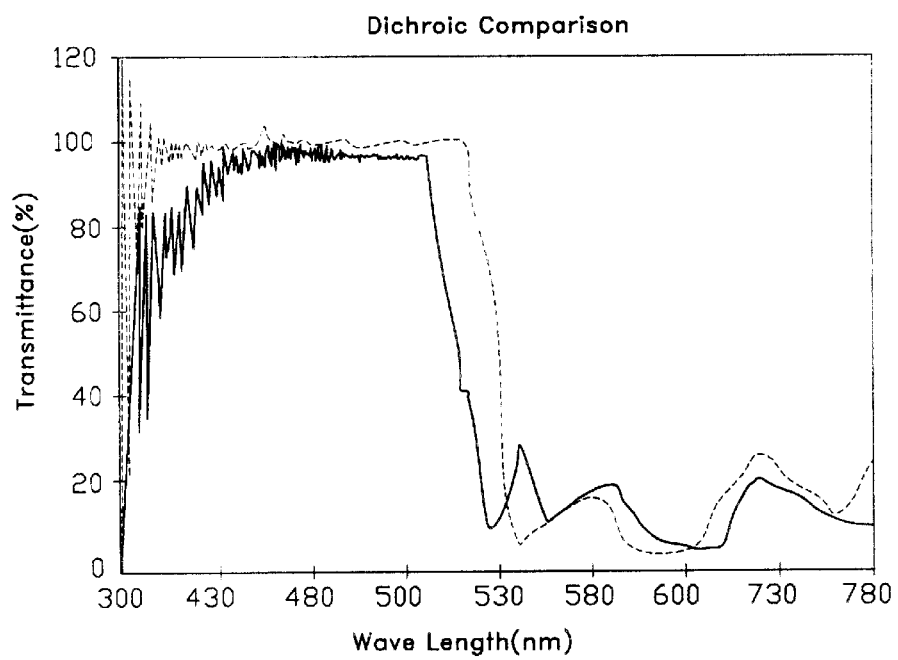

FIGS. 5 and 6 depict a comparison between the dichroic filter of the present invention and the conventional dichroic filter in terms of transmission and reflection characteristics, respectively.

The graphs of FIGS. 5 and 6 illustrate respective transmittances and respective reflection factors exhibited in the dichroic filter of the present invention having a flat plate type structure and the conventional dichroic filter having a cube prism type structure. In each of FIGS. 5 and 6, the graph depicted by the solid line is associated with the conventional cube prism type dichroic filter whereas the graph depicted by the phantom line is associated with the flat plate type dichroic filter according to the present invention.

Referring to FIGS. 5 and 6, it can be found that the dichroic filter according to the present invention improves wave optical effects, thereby resulting in an improvement in filter performance, because it has a plate type structure.

Figure 1:
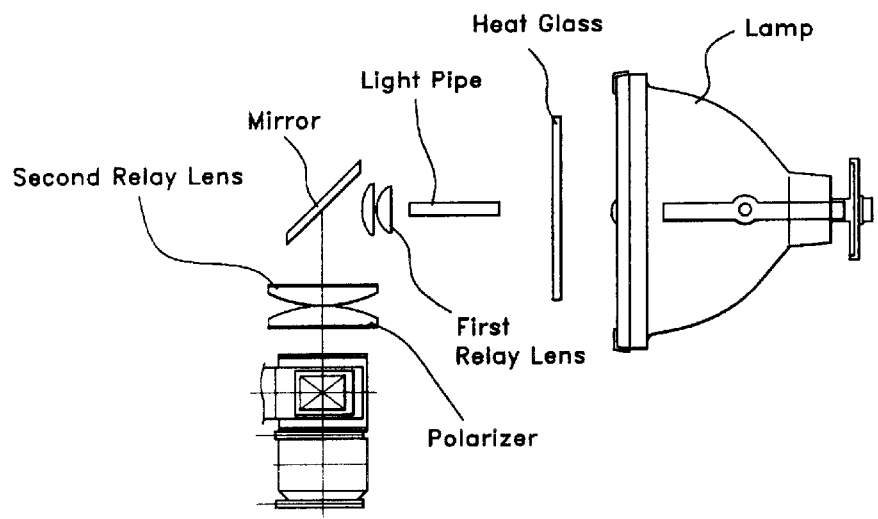
FIG. 1 is a schematic side view illustrating an optical projection engine.
Figure 2:
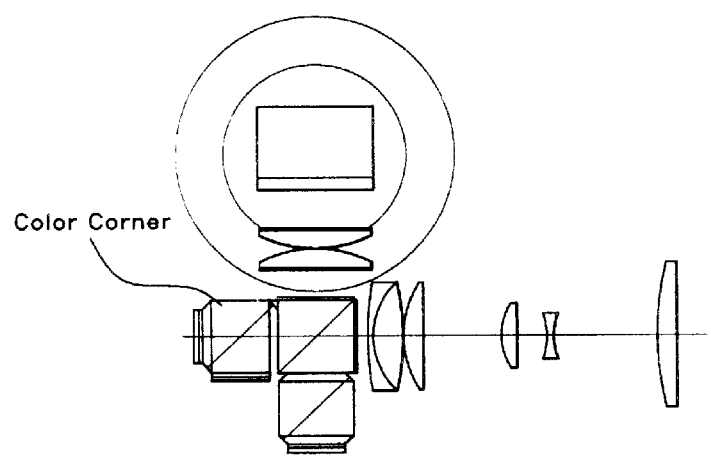
FIG. 2 is a schematic front view of the optical projection engine, illustrating the configuration of a color corner included in the optical projection engine.
Figure 3:
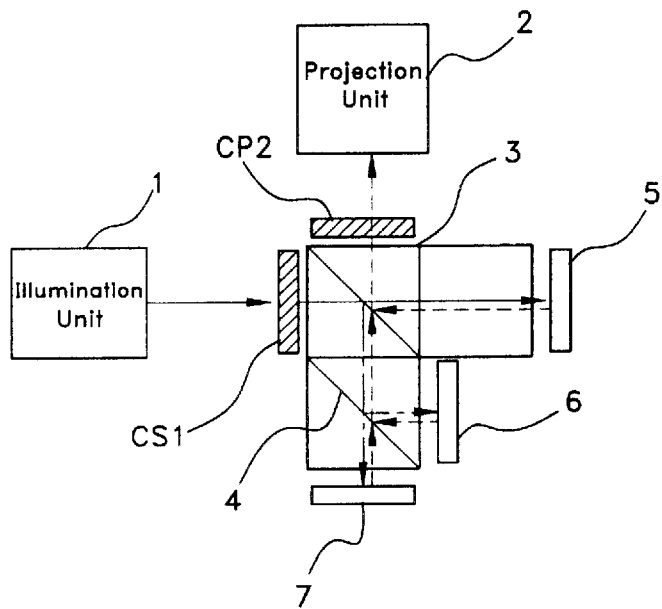
FIG. 3 is a schematic view illustrating the configuration of a color corner included in a conventional projection system.
Figure 7:
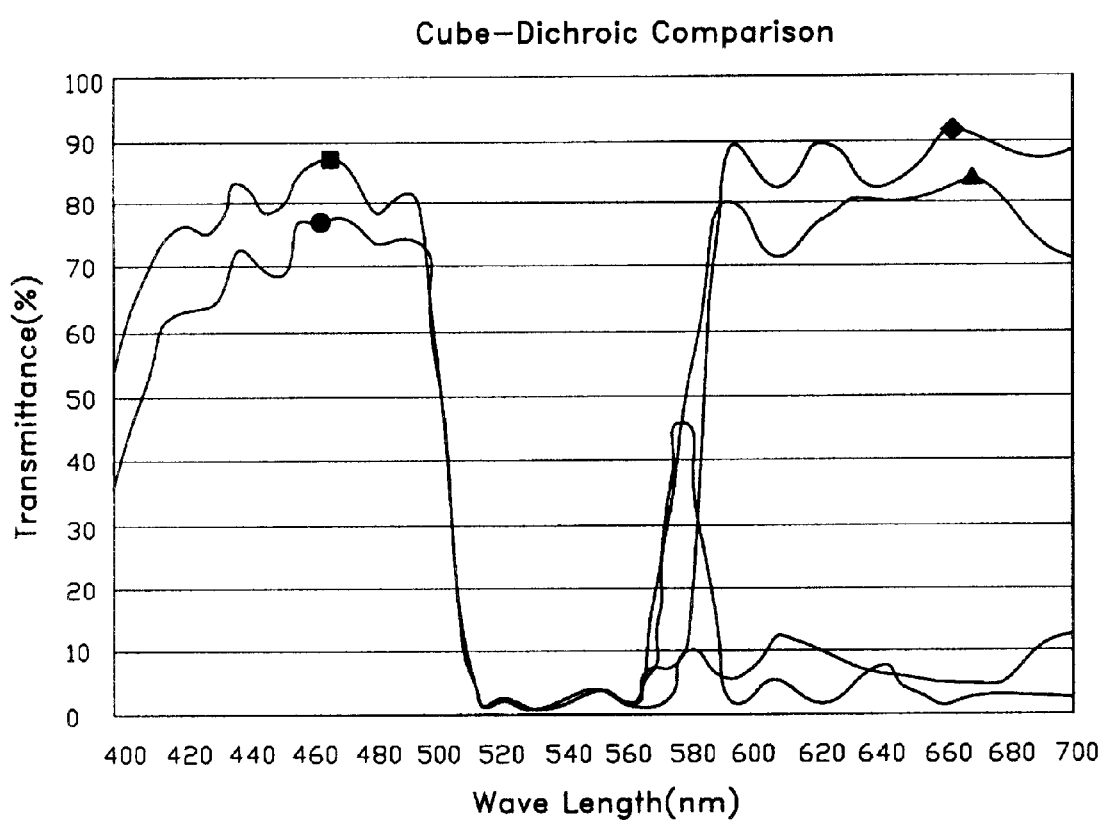
FIG. 7 depicts graphs respectively illustrating a comparison between the dichroic filter of the present invention and the conventional dichroic filter in terms of the transmission characteristics for B and R-color light beams.

FIG. 7 illustrates a comparison between the dichroic filter of the present invention and the conventional dichroic filter in terms of the transmission characteristics for B and R-color light beams. In FIG. 7, the graph depicted by the "●"-line illustrates the transmittance of the cube prism type dichroic filter for B-color light beams, and the graph depicted by the "▲"-line illustrates the transmittance of the cube prism type dichroic filter of FIG. 3 for R-color light beams.

On the other hand, the graph depicted by the "■"-line in FIG. 7 illustrates the of the flat plate type dichroic filter of FIG. 4 for B-transmittance color light beams, and the graph depicted by the "♦"-line in FIG. 7 illustrates the transmittance of the flat plate type dichroic filter for R-color light beams.

Referring to FIG. 7, it can be found that the dichroic filter having a flat plate type structure in accordance with the present invention can obtain maximum transmission characteristics for B and R-color light beams, as compared to the convention dichroic filter having a cube prism type structure.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

As apparent from the above description, in the projection system of the present invention, the dichroic filter included in the color corner is configured to have a plate type structure. By virtue of such a structure of the dichroic filter, it is possible to obtain improved wave optical effects, and thus an improvement in the separation characteristics of the filter.

In addition, there is a reduction in the material costs upon a mass production of the dichroic filter in that the dichroic filter has the plate type structure. Accordingly, the projection system can be inexpensively manufactured.

What is claimed is:

1. In a projection system including an illumination unit for separating S-polarized light from non-polarized white light, and emitting the separated light; and a projection unit for reflecting light, contained with an image and incident thereto, onto a screen, thereby allowing the image to be formed on the screen; said projection system comprising:

a first color selecting polarization plate for polarizing a selected one of R, G, and B components of the S-polarized light, from the illumination unit, into P waves while transmitting the remaining components of the S-polarized light;

a polarized beam splitter for transmitting the P-polarized component of the light incident thereto after being transmitted through the first color selecting polarization plate while reflecting the remaining two components of the incident light, thereby changing the travel direction of the remaining light components;

a flat plate type dichroic filter defining different transmission and reflection optical paths for the separated two light components, respectively, thereby individually separating the two light components reflected by the polarized beam splitter;

LCDs for providing respective images corresponding to the light component transmitted through the polarized beam splitter and the light components separated by the flat plate type dichroic filter; and a second color selecting polarization plate for providing, to the projection unit, the separated R, G, and B-color light components from the LCDs in a state containing images while being changed in polarity, after controlling the R, G, and B-color light components to have the same polarity;

wherein the flat plate type dichroic filter has a minimum astigmatism and a thickness of 0.5 mm or less.

* * * * *